United States Patent [19]

Malmquist et al.

[11] Patent Number: 4,533,129
[45] Date of Patent: Aug. 6, 1985

[54] ELECTRICAL CONNECTOR LOCATOR PLATE

[75] Inventors: Jerome A. Malmquist, Shoreview; Dean K. Reidt, Cottage Grove, both of Minn.

[73] Assignee: Minnesota Mining and Manufacturing Company, St. Paul, Minn.

[21] Appl. No.: 569,276

[22] Filed: Jan. 9, 1984

[51] Int. Cl.³ .......................... H01R 43/04; B25B 1/02
[52] U.S. Cl. ...................................... 269/207; 29/749; 29/760; 269/903
[58] Field of Search ................. 29/749, 751, 753, 760; 269/207, 903, 307, 277

[56] References Cited

U.S. PATENT DOCUMENTS 4,393,580 7/1983 Hall, Jr. ................................. 29/749
4,479,301 10/1984 Resch ................................. 29/749 X Primary Examiner—Carl Hall
Attorney, Agent, or Firm—Donald M. Sell; James A. Smith; Terryl K. Qualey

[57] ABSTRACT

A locator plate for positioning a plurality of different length multi-contact insulation displacement connectors for connection to multi-conductor flat cables has movable end guides for the connectors and a plurality of shims individually slidable along a shim support rod and pivotable on the shim support rod to a position between the end guides to define the proper spacing between the end guides for each of the connectors.

11 Claims, 7 Drawing Figures

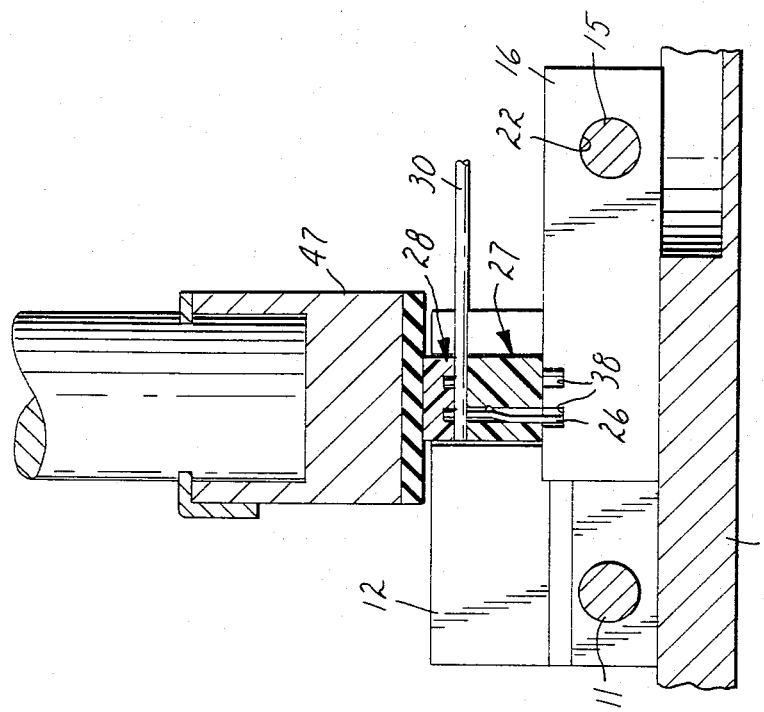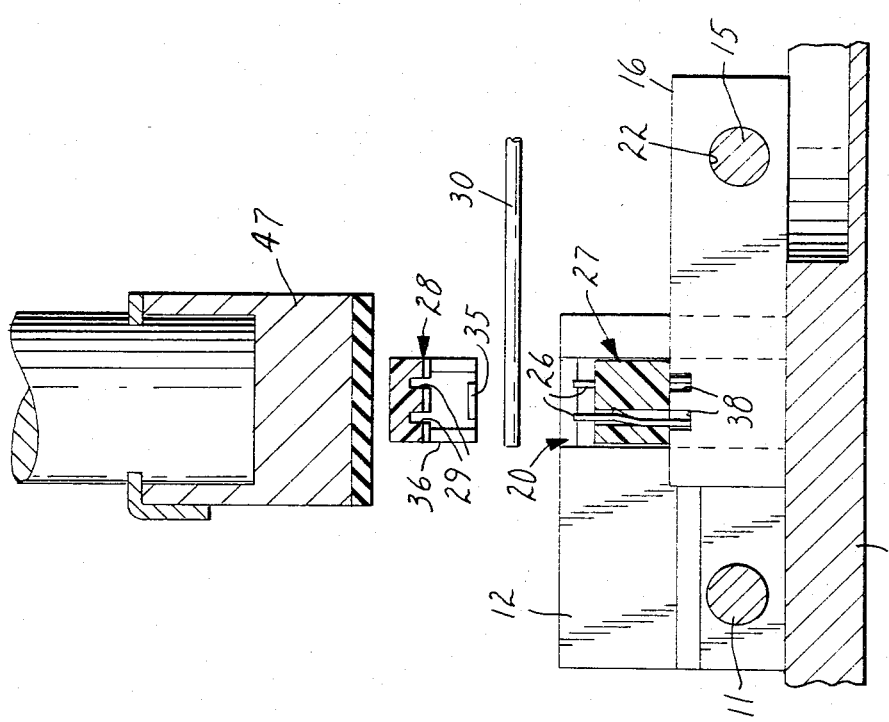

ID PATENT NUMBER OMITTED

ELECTRICAL CONNECTOR LOCATOR PLATE

FIELD OF THE INVENTION

The present invention relates to a locator plate for positioning a plurality of different length multi-contact insulation displacement connectors for connection to multi-conductor flat cables.

BACKGROUND OF THE INVENTION

Multi-contact insulation displacement connectors are widely used to connect to multi-conductor flat cables to make electrical connections in computer equipment. These connectors commonly have from 10 to 64 contact elements for connecting to a like number of conductors in a flat cable. Electrical connection between the contact elements in the connector and the conductors in the cable is commonly made by first placing the cable between the body of the connector carrying the contact elements and a connector cover. A press is then used to push the cover onto the body to force the conductors into the contact elements which cut through the electrical insulation and make electrical connection to the conductors.

To assure connection to the proper conductors in the proper contact elements, it is important to precisely align the flat cable with the connector prior to pressing the cover onto the body. Fixtures have been designed to provide the proper alignment between the connector parts and flat cables. One such fixture is illustrated in U.S. Pat. No. 4,393,580. Because connectors of the same type commonly have from 10 to 64 contacts, and different lengths to accommodate the different number of contacts, the fixtures are commonly adjustable to accommodate many different lengths of connectors. In prior connector locator plates the adjustment in the spacing has been made by positioning connector end guides and fixing them in position with set screws or by having a pin fit into a hole at the proper end guide positions.

SUMMARY OF THE INVENTION

The present invention provides a locator plate for positioning a plurality of different length multi-contact insulation displacement connectors for connection to multi-conductor flat cables. It comprises a base plate, an end guide support rod, a pair of connector end guides, a shim support rod and a plurality of shims. The end guide support rod is mounted parallel to the base plate and the shim support rod is mounted parallel to and spaced from the end guide support rod. The connector end guides have facing connector end guide channels that extend perpendicular to the base plate and at least one of the end guides is slidable along the end guide support rod toward and away from the other end guide to change the spacing between the end guide channels. The shims have parallel major faces and are mounted on the shim support rod with their major faces perpendicular to the axis of the support rod. The shims are slidable along the shim support rod and they extend from the shim support rod a sufficient distance to extend into the space between the connector end guides to define the spacing between the end guides. The shims are individually pivotable on the shim support rod out of the space between the connector end guides to permit the movable end guide to be slid closer to the other end guide.

THE DRAWING

Figure 1:
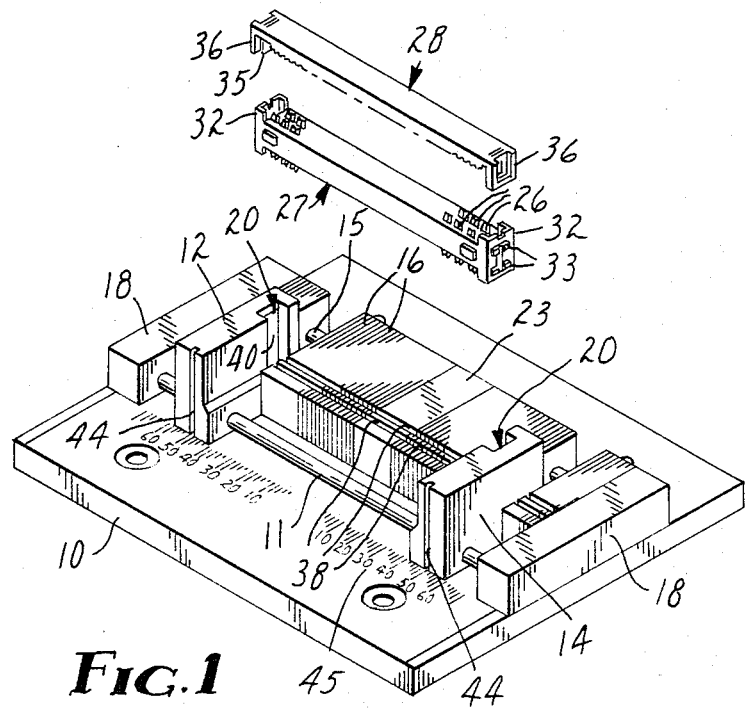
FIG. 1 is a top perspective view of a locator plate constructed in accordance with the present invention with a body and a cover of a connector shown above the plate in alignment with the connector end guide channels in the end guides of the locator plate.
Figure 2:
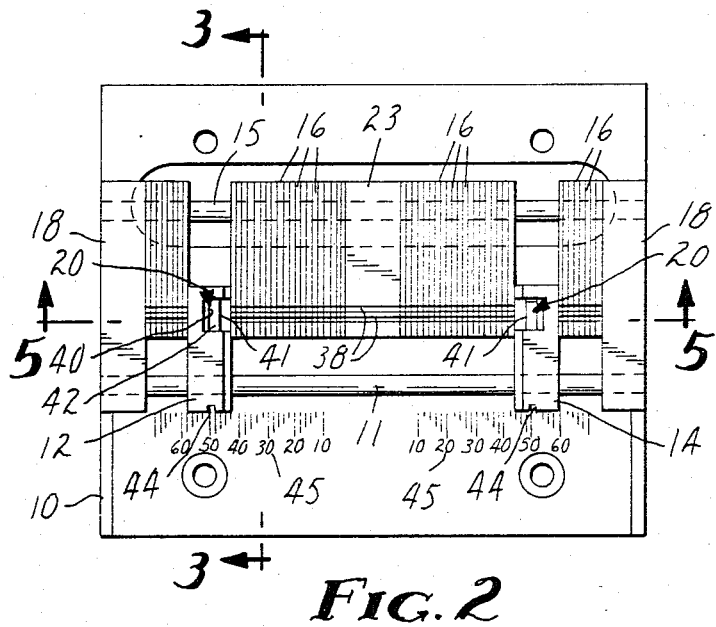
FIG. 2 is a top view of the locator plate.
Figure 3:
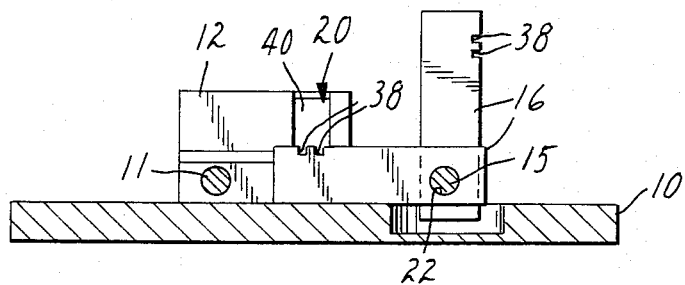
FIG. 3 is a transverse cross-sectional view taken generally along line 3—3 of FIG. 2 with one of the shims pivoted to a vertical position out of the space between the end guides.
Figure 4:
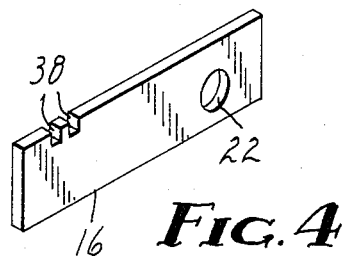
FIG. 4 is a perspective view of one of the shims forming part of the locator plate.
Figure 5:
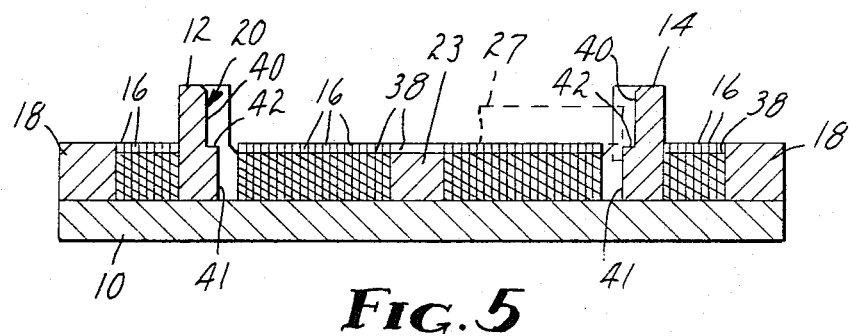
FIG. 5 is a longitudinal cross-sectional view taken generally along line 5—5 of FIG. 2.

FIG. 6 is a view similar to that of FIG. 3 with the connector body in position on the locator plate, a flat cable between the connector body and cover and the platen of a press above the cover; and FIG. 7 is a view like that of FIG. 6 after the platen has pressed the connector cover onto the body and forced the flat cable into the contact elements in the body causing the contact elements to cut through the insulation of the flat cable and make electrical connection with the conductors of the flat cable.

DESCRIPTION OF THE PREFERRED EMBODIMENT

The locator plate of the present invention comprises a base plate 10, an end guide support rod 11, a pair of connector end guides 12 and 14, a shim support rod 15 and a plurality of shims 16. The end guide support rod 11 is mounted parallel to the base plate 10 with its ends supported in end stop blocks 18 secured to the base plate at opposite edges thereof.

The connector end guides 12 and 14 have facing connector end guide channels 20 that extend perpendicular to the base plate 10 for the receipt of the ends of a connector. In the illustrated embodiment both of the connector end guides 12 and 14 are formed with an aperture through which the end guide support rod 11 passes so that the end guides are slidable toward and away from each other to change the spacing between the end guide channels 20.

The shim support rod 15 is mounted parallel to and spaced from the end guide support rod 11 and also has its ends supported in the end stop blocks 18. Each shim 16 has parallel major faces and an aperture 22 through its major faces, adjacent one end, of a size generally equal to the diameter of the shim support rod 15. The shim support rod 15 passes through the shim apertures 22 so that the major faces of the shims are perpendicular to the axis of the support rod and the shims are slidable along the support rod. The shims 16 extend from the shim support rod 15 a sufficient distance to extend into the space between the connector end guides 12 and 14 to define the spacing between the end guides and they are individually pivotable on the shim support rod out of the space between the connector end guides to permit the end guides to be slid closer to each other. In the illustrated embodiment all of the shims 16 are the same thickness to permit the space between the end guides 12 and 14 to be changed by the same incremental spacing. However, it is also contemplated that shims of different thicknesses may be utilized if only a certain number of preselected spacings are desired. A center stop block 23 is permanently mounted on the base plate 10 between the end guides 12 and 14 and centrally between the end stop blocks 18 to separate the shims 16 into two equal groupings on either side of the center stop block and to define a minimum spacing between the end guides 12 and 14.

The illustrated locator plate is designed to be used to connect flat cables to other flat cables or to discrete wires through insulation displacement contact elements 26. Each of the contact elements extends through an insulating plastic body 27 and has an insulation displacement connecting end extending from each of the opposed surfaces of the body. An insulating plastic cover 28 is designed to fit similarly over either of the surfaces of the body 27 through which the contact elements 26 extend, and it is formed with two parallel longitudinal slots 29 (see FIG. 6) into which the ends of the contact elements 26 may extend after they have cut through the insulation on a flat cable 30 and made connection to the conductors within the flat cable. At each end, the connector body 27 is formed as a U-shaped channel 32 that extends from both connector surfaces, each of which has two sets of latching tabs 33 on its exterior surface. The cover 28 is formed at each end with a tongue 35 to fit within the channel 32 and a U-shaped latch 36 to fit over the outside of the channel and engage one set of latching tabs 33. The second set of latching tabs 33 at each end of the body 27 is provided for latching an identical cover over the opposed surface of the body.

Each shim 16 and the center stop block 23 are similarly formed with a pair of parallel slots 38 extending from one edge thereof so that the slots in the shims 16 between the end guides 12 and 14 align with the slots in the center stop block 23 to form two parallel elongate slots 38 positioned to receive the ends of the insulation displacement contact elements 26 extending in two parallel rows from one surface of the connector (see FIGS. 6 and 7). To permit maximum versatility in the manner in which the connector may be applied to cables, the connector end guide channels 20 in the end guides 12 and 14 are each formed with an upper channel section 40 and a lower channel section 41 separated by a step 42 which has a width generally equal to the difference that one end of the cover 28 extends beyond the corresponding end of the body 27. This permits the connector to be applied by first placing either the body 27 on the locator plate, as illustrated in FIGS. 6 and 7, with the channel extensions 32 fitting over the shims and within the lower channel sections 41 or a cover to be inverted and placed on top of the shims 16 and in the upper channel sections 40.

FIGS. 6 and 7 illustrate a typical connection of one flat cable between a cover 28 and a body 27 using the locator plate. Shims 16 are first pivoted on the shim support rod 15 to permit the end guides 12 and 14 to be slid along the end guide support rod 11 to align position indicators 44 on the end guides 12 and 14 with indicia 45 on the base plate 10 indicating the number of contact elements 26 in the connector to be applied. When the end guides 12 and 14 are properly positioned the shims 16 are appropriately slid along and pivoted on the shim support rod 15 to distribute them to fill the spaces between the end stop blocks 18 and the end guides 12 and 14, and between the end guides and the center stop block 23 to lock the end guides 12 and 14 in their proper positions.

A connector body 27 may then be placed on the locator plate with its channel extensions 32 extending into the lower channel sections 41 in the end guides 12 and 14 and its contact elements 26 extending into the slots 38 in the shims 16 and the center stop block 23. In the illustrated embodiment the slots 38 are the same depth as the contact elements 26 extend from the surfaces of the connector body 27 so that they support the ends of the contact elements 26 and prevent them from being displaced in the connector body 27 when the flat cable 30 is forceably applied to the ends of the contact elements extending from the opposite surface of the body. A flat cable 30 is next positioned over the contact elements 26 extending from the upper surface of the body with the edges of the cable being guided by the major faces of the end guides 12 and 14 to properly position the cable with respect to the contact elements 26. A cover 28 is then manually pressed down onto the body and is forceably applied by the platen 47 of a press to force the conductors of the flat cable 30 into the contact elements 26 and to latch the cover 28 to the body 27. The connector with the cable applied may then be inverted such that the applied cover fits in the upper channel section 40 in the end guides 12 and 14 and another flat cable or discrete wires may be connected in the ends of the contact elements exposed on the upper surface of the body. A second cover 28 may then be applied to connect those wires and to latch to the connector body to complete the connector.

One preferred embodiment of the locator plate of the present invention is constructed for connecting 10 to 64 position connectors of the type illustrated to flat cables having a like number of conductors on 0.050 inch centers. The center stop block 23 is 0.494 inch wide and there are 54 shims each having a width of 0.050 inch.

We claim:

1. A locator plate for positioning a plurality of different length multi-contact insulation displacement connectors for connection to multi-conductor flat cables, comprising:
   a base plate,
   an end guide support rod mounted parallel to said base plate,
   a pair of connector end guides having facing connector end guide channels that extend perpendicular to said base plate, at least one of said end guides being slidable along said end guide support rod toward and away from the other end guide to change the spacing between said end guide channels,
   a shim support rod mounted parallel to and spaced from said end guide support rod,
   a plurality of shims having parallel major faces mounted on said shim support rod with their major faces perpendicular to the axis of said support rod and being slidable along said shim support rod, said shims extending from said shim support rod a sufficient distance to extend into the space between said connector end guides to define the spacing between said end guides and being individually pivotable on said shim support rod out of the space between said connector end guides to permit said movable end guide to be slid closer to the other end guide.

2. The locator plate of claim 1 wherein both of said connector end guides are slidable along said end guide support rod.

3. The locator plate of claim 1 including an end stop block mounted on said base plate such that said movable end guide is between said end stop block and the other end guide, said end stop block supporting the ends of said end guide support rod and said shim support rod, said shims being individually positionable either between said end guides or between said movable end guide and said stop block to define a plurality of possible spacings between said connector end guide channels in said end guides.

4. The locator plate of claim 3 wherein both of said connector end guides are slidable along said end guide support rod and each end of said end guide support rod and said shim support rod is similarly supported in an end stop block mounted on said base plate.

5. The locator plate of claim 4 including a center stop block mounted on said base plate between said connector end guides, centrally between said end stop blocks.

6. The locator plate of claim 1 wherein each shim has a pair of parallel slots extending into the shim from one edge thereof, the slots in each of the shims positioned between said end guides aligning to form two parallel elongate slots positioned to receive the ends of insulation displacement contact elements extending in two parallel rows from one surface of an insulation displacement connector.

7. The locator plate of claim 6 wherein the bases of said two elongate slots are positioned to support the ends of the insulation displacement contact elements.

8. The locator plate of claim 6 wherein both of said connector end guides are slidable along said end guide support rod.

9. The locator plate of claim 6 wherein an end stop block is mounted on said base plate such that said movable end guide is between said stop block and the other end guide, said stop block supporting the ends of said end guide support rod and said shim support rod, and said shims being individually positionable either between said end guides or between said movable end guide and said stop block to define a plurality of possible spacings between said connector end guide channels in said end guides.

10. The locator plate of claim 9 wherein both of said connector end guides are slidable along said end guide support rod and that each end of said end guide support rod and said shim support rod is supported in an end stop block mounted on said base plate.

11. The locator plate of claim 10 including a center stop block mounted on said base plate between said end guides, centrally between said end stop blocks, said center stop block being formed with a pair of parallel slots extending into the upper surface thereof which slots align with the slots in the shims positioned between said connector end guides.

* * * * *